Jan. 29, 1952 C. C. TALLEY 2,583,901
HARDWARE INSULATOR FOR VEHICLES
Filed June 30, 1950
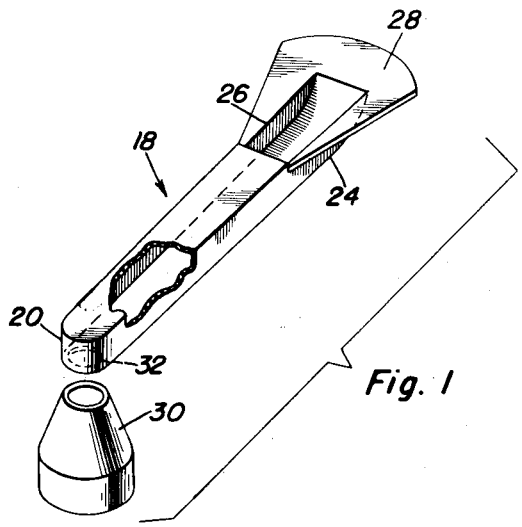
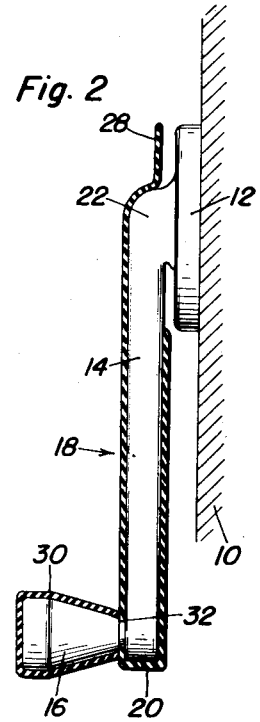
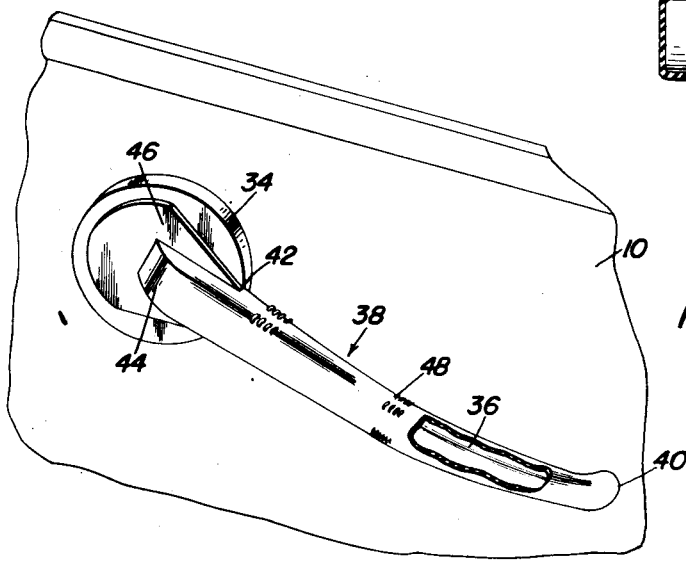
Calvin C. Talley
INVENTOR.

Patented Jan. 29, 1952

2,583,901

UNITED STATES PATENT OFFICE 2,583,901

HARDWARE INSULATOR FOR VEHICLES

Calvin C. Talley, Levelland, Tex.

Application June 30, 1950, Serial No. 171,257

1 Claim. (Cl. 150—52)

This invention relates to shields of insulating material to fit snugly on all door handles, window and ventilator crank arms, and other metallic knobs in automotive vehicles primarily designed to eliminate electric shock.

Operators and users of automobiles, especially closed cars provided with thick plush upholstery, are often troubled with discharge of static electricity. Sliding contact with the plush upholstery produces a considerable charge of static which is discharged when one's hand moves in close proximity to metallic handles and other parts of the car.

It is the primary object of the present invention to avoid this inconvenience by preventing the accumulation of static charges upon the metallic hardware in the interior of the automobile.

Another important object of this invention is to provide insulating shields for the hardware of an automotive vehicle which are relatively simple in design and construction, flexible, easy to assemble and disassemble upon the hardware, inexpensive, and very useful for their intended purposes.

These, together with various ancillary objects and features of the invention which will later become apparent as the following description proceeds, are attained by the device, a preferred embodiment of which has been illustrated by way of example only in the accompanying drawings, wherein:

Figure 1 is a group perspective view of the shield itself;

Figure 2 is a longitudinal sectional view through the assembled crank arm shown in Figure 1; and, Figure 3 is a perspective view of the shield shown assembled upon a door handle, the shield being partially broken away to show details of construction.

Specific reference is now made to the drawings. In the several views in the accompanying drawings and in the following specification reference characters indicate corresponding elements throughout:

Indicated generally at 10 is the front wall of the door of an automotive vehicle on which is secured a conventional metallic fixture 12 for rotatably receiving a crank arm 14 having a removable knob 16 at its free end, the crank arm being employed to raise and lower windows, ventilators, etc. The static electricity resister of the present invention which is assembled upon this crank arm is shown generally at 18, the construction of which is shown in greater detail in the group perspective view in Figure 1.

The shield is fabricated of preferably 1/16 of an inch thick insulating material such as rubber or plastic which is tubular and closed at one end as at 20. The shield is generally of the same size and shape of the crank arm 14 and is flexible so that it can be slipped on the crank arm to fit tightly thereabout. Inasmuch as the crank arm is arcuated as at 22, the shield is also arcuated as at 24 and is open at its upper arcuate end as at 26. At this upper arcuate portion, the shield includes a generally sector-shaped extension 28 which partially embraces loosely the metallic fixture 12.

The shield also includes a hollow flexible portion which is roughly of the same dimensions and shape as the knob 16, this portion being shown at 30. This insulating portion is also flexible and is slipped onto the knob 16 before the knob is secured to the crank arm 14, an aperture 32 being provided adjacent the closed end of the shield 18 to allow the knob to be secured to the crank arm. Thus it will be seen that the insulating shield completely covers the knob and the crank arm and a substantial portion of the metallic bearing fixture 12 so that all possibility of the discharge of static electricity to the fingers of a person in the crank arm, the knob and the fixture 12 will be substantially eliminated.

In Figure 3 is shown a further application of the present shield. Indicated at 34 is a substantially circular fixture secured to the inner wall 10 of the door of the automotive vehicle in which is pivoted for horizontal movement a conventional door handle 36. The shield 38 is tubular and of approximately the same shape and dimension as the door handle and is flexible so that it can be slipped onto the door handle and will fit snugly thereabout. The shield is closed as at 40. At its other end, the shield is cut away as at 42 to provide a shoulder engaging the peripheral edge of the fixture 34. Inasmuch as the handle is arcuated at its pivotal attachment to the fixture 34 the shield is also arcuated as at 44 so that the arcuation 44 cooperating with the shoulder 42 and closed end 40 will prevent relative movement of the shield on the handle.

At the arcuate end 44, the shield includes an extension 46 which is sectoral in shape and partially covers the metallic fixture 34. It will be understood that the outer surface of the shield will include gripping serrations 48.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

In an automotive vehicle including a window crank arm having a knob at one end, said arm being curved at the other end and journaled in a fixture attached to the inner wall of the vehicle; an electric shock resistor comprising a tubular resilient shield of insulating material positioned on said arm, said shield conforming substantially to the shape and dimensions of said arm and knob and including an enlarged sectoral-shaped extension covering a substantial portion of said fixture.

CALVIN C. TALLEY.

REFERENCES CITED

The following references are of record in the file of this patent:

UNITED STATES PATENTS

| Number | Name | Date |
| --- | --- | --- |
| 571,025 | Spaner et al. | Nov. 10, 1896 |
| 629,999 | Jacobs | Aug. 1, 1899 |
| 1,410,605 | Schacht | Mar. 28, 1922 |
| 1,633,938 | Jones | June 28, 1927 |
| 1,668,716 | Herdman et al. | May 8, 1928 |
| 1,830,383 | Bos | Nov. 3, 1931 |
| 2,070,955 | Parisol | Feb. 16, 1937 |
| 2,236,208 | Creel | Mar. 25, 1941 |
| 2,247,592 | Swift | July 1, 1941 |